US005599502A

United States Patent [19]

Miyazaki et al.

[11] Patent Number: 5,599,502

[45] Date of Patent: Feb. 4, 1997

[54] LIQUID MOVING APPARATUS AND MEASURING APPARATUS UTILIZING THE SAME

[75] Inventors: Takeshi Miyazaki, Ebina; Matsuomi Nishimura, Ohmiya; Kazuo Isaka, Tokyo; Kazumi Tanaka, Yokohama; Toshikazu Ohnishi, Machida; Yoshito Yoneyama, Kawasaki; Hidehito Takayama, Chigasaki, all of Japan

[73] Assignee: Canon Kabushiki Kaisha, Tokyo, Japan

[21] Appl. No.: 280,132

[22] Filed: Jul. 25, 1994

Related U.S. Application Data

[63] Continuation of Ser. No. 50,604, Apr. 22, 1993, abandoned.

[30] Foreign Application Priority Data

| | | | |
|---|---|---|---|
| Apr. 27, 1992 | [JP] | Japan | 4-107669 |
| Nov. 9, 1992 | [JP] | Japan | 4-298718 |

[51] Int. Cl.[6] .......... G01N 27/00; G01N 21/00; G01N 21/85

[52] U.S. Cl. .......... 422/82.01; 422/82.04; 422/82.05; 422/82.06; 356/410

[58] Field of Search .......... 422/82.01–82.06; 356/410, 411, 414, 440; 250/576, 575; 417/213, 228; 239/136, 379; 137/888

[56] References Cited

U.S. PATENT DOCUMENTS

| | | | |
|---|---|---|---|
| 2,039,275 | 4/1936 | McGrael | 137/888 X |
| 2,215,132 | 9/1940 | Parker | 137/888 X |
| 3,380,584 | 4/1968 | Fulwyler | 209/3 |
| 3,473,567 | 10/1969 | Kitchenmaster | 137/888 X |
| 3,705,771 | 12/1972 | Friedman et al. | 356/39 |
| 3,992,109 | 11/1976 | Bock | 356/181 |
| 4,099,882 | 7/1978 | Andren et al. | 356/181 |
| 4,318,483 | 3/1982 | Lombardo et al. | 209/3.1 |
| 4,398,894 | 8/1983 | Yamamoto | 436/517 |
| 4,436,827 | 3/1984 | Tamagawa | 436/534 |
| 4,546,360 | 10/1985 | Fischbeck et al. | 346/1.1 |
| 4,566,791 | 1/1986 | Goldsmith | 356/246 |
| 4,637,729 | 1/1987 | Schoch | 356/410 |
| 4,723,129 | 2/1988 | Endo et al. | 346/1.1 |
| 4,740,796 | 4/1988 | Endo et al. | 346/1.1 |
| 4,778,593 | 10/1988 | Yamashita | 209/3.1 |
| 4,790,640 | 12/1988 | Nason | 350/534 |
| 4,794,806 | 1/1989 | Nicoli et al. | 73/863.01 |
| 4,863,264 | 9/1989 | Miyake et al. | 356/39 |
| 4,867,559 | 9/1989 | Bach | 356/73 |
| 4,934,564 | 6/1990 | Piatt | 222/14 |
| 4,991,774 | 2/1991 | Kelly | 239/3 |
| 4,999,582 | 3/1991 | Parks et al. | 324/438 |
| 5,052,897 | 10/1991 | Yamashita et al. | 417/228 |
| 5,125,747 | 6/1992 | Sayegh et al. | 356/407 |
| 5,183,740 | 2/1993 | Ligler et al. | 435/7.32 |
| 5,370,842 | 12/1994 | Miyazaki et al. | 422/82.06 |

FOREIGN PATENT DOCUMENTS

| | | |
|---|---|---|
| 0268237 | 5/1988 | European Pat. Off. . |
| 421406A2 | 10/1990 | European Pat. Off. . |
| 0421406 | 4/1991 | European Pat. Off. . |
| 0545284 | 6/1993 | European Pat. Off. . |
| 149785 | 12/1931 | Switzerland . |
| 8100911 | 4/1981 | WIPO . |

OTHER PUBLICATIONS

Senichi Masuda, et al, "Novel Method of Cell Fusion in Field Constriction Area in Fluid Integrated Circuit", Conference Record of the 1987 IEEE Industry Applications Society Annual Meeting Part II, pp. 1549–1553.

*Primary Examiner*—Harold Pyon
*Attorney, Agent, or Firm*—Fitzpatrick, Cella, Harper & Scinto

[57] ABSTRACT

A minute flow path is filled with liquid so that the liquid may be supplied from an accumulating portion. Energy is imparted to the liquid exposed outwardly of an opening in the flow path by a heat generating element or by energy application to thereby heat and gasify the liquid. Thereupon, the liquid is supplied by an amount corresponding to the gasified liquid by capillary phenomenon through the flow path, and gasification is continuously effected, whereby a flow free of pulsating flow can be formed in the flow path.

8 Claims, 9 Drawing Sheets

LIQUID MOVING APPARATUS AND MEASURING APPARATUS UTILIZING THE SAME

This application is a continuation, of application Ser. No. 08/050,604, filed Apr. 22, 1993, now abandoned.

BACKGROUND OF THE INVENTION

1. Field of the Invention

This invention relates to a technique of moving liquid in a flow path to thereby form a flow.

2. Related Background Art

Pumps of various types are known as means for moving liquid. They are divided broadly into non-volume type pumps and volume type pumps by the basic principle and mechanism. The non-volume type pumps include centrifugal pumps, mixed flow pumps, axial flow pumps, friction pumps, etc. The volume type pumps include reciprocating pumps, rotary pumps, etc.

The reciprocating pumps are often used to feed a relatively slight quantity of liquid. The reciprocating pumps include recipro-type pumps and syringe-type pumps. The recipro-type pump is a pump in which a plunger is reciprocated at a high speed in a syringe and liquid is fed by the differential between an inlet valve and a discharge valve, and the syringe-type pump is a pump in which liquid is inhaled into a syringe and a plunger is moved to discharge and feed the liquid. These pumps are capable of even feeding liquid at a slight flow rate of the order of 10 μl/min.

These conventional pumps, however, are bulky and have suffered from the problem that dead space in the cylinder of the pump is unavoidable and a great deal of liquid including the volume of liquid in the cylinder becomes necessary as a whole quantity of liquid.

In order to eliminate this problem, an apparatus as a micropump which can feed a slight quantity of liquid is proposed in a U.S. patent application Ser. No. 07/979,811 filed on Nov. 20, 1992. This apparatus is such that a resistance heat generating element or a piezoelectric element is provided in a minute tubular flow path and a short pulse-like voltage is applied thereto, whereby a slight quantity of fluid is discharged outwardly as a droplet by the impact force of a volume change caused by a bubble momentarily created by the heating of the resistance heat generating element or a momentary volume change caused by the electrostriction of the piezo-electric element, and the pulse voltage is repetitively imparted to repeat the discharge of a droplet for each pulse and thereby form a flow in the flow path.

This micropump is very compact and is an excellent system which has no dead space like a cylinder and can therefore feed a slight quantity of liquid accurately.

SUMMARY OF THE INVENTION

The present invention further improves the above-described micropump and has as its object the provision of a method of and an apparatus for feeding a slight quantity of liquid without any pulsating flow.

One form of the liquid moving method of the present invention which achieves the above object is characterized by continuously gasifying liquid exposed from an opening in a flow path, thereby moving liquid in the flow path.

Also, one form of the liquid moving apparatus of the present invention has a flow path and energy imparting means for imparting energy for continuously gasifying liquid exposed from an opening in said flow path, and is characterized in that said energy imparting means is operated to thereby move liquid in the flow path.

DETAILED DESCRIPTION OF THE PREFERRED EMBODIMENTS

Figure 1A:
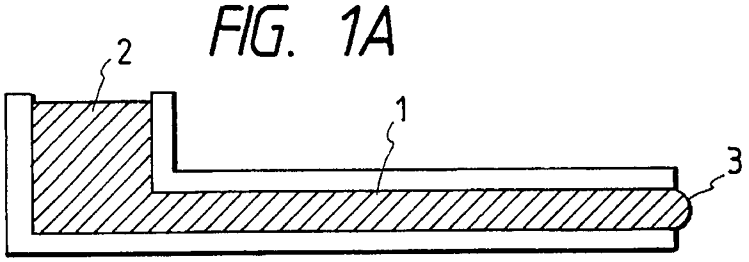
FIGS. 1A and 1B are views for illustrating the basic concept of the system of the present invention.
Figure 1B:
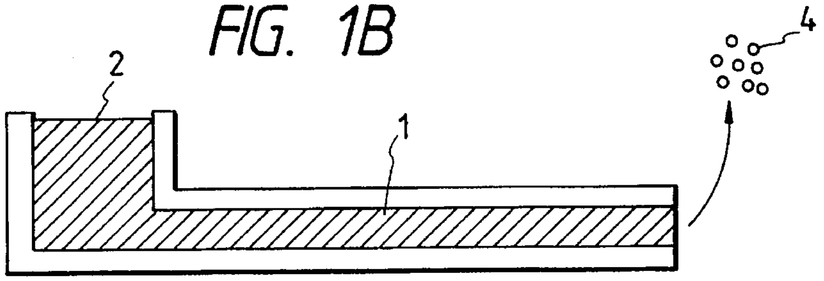

The principle of liquid movement of the present invention will hereinafter be described with reference to FIGS. 1A and 1B. FIGS. 1A and 1B are side views, in which a liquid reservoir portion 2 for storing liquid therein is connected to one end of a minute flow path 1 and the other end of the minute flow path provides an opening portion 3. In the state of FIG. 1A, the resistance in the flow path 1 and the surface tension of the surface of liquid exposed outwardly of the opening portion 3 are balanced with the pressure by the liquid level in the liquid reservoir portion 2 and the flow is stationary. When gasifying energy is imparted to the liquid exposed outside of the opening portion 3, the liquid in the opening portion 3 is gasified and discharged as gasified materials 4, as shown in FIG. 1B. Thereupon, the liquid corresponding to the gasified amount is supplied by capillary phenomenon and flows to the opening portion 3 through the flow path 1. If the gasifying energy is continuously imparted to continue the gasification, there can be formed a flow free of any pulsating flow in the flow path. Also, the fed liquid is completely gasified and no waste liquid is created.

A liquid moving method based on the above-described principle utilizes the capillary phenomenon and is therefore suitable for a case where the opening in the flow path is small in cross-sectional area, and is suitable for moving a slight quantity of liquid. The cross-sectional area of the opening in the flow path may preferably be within a range of 1 $\mu m^2$–20 $mm^2$, and more preferably be within a range of 1 $\mu m^2$–1 $mm^2$.

The liquid is not limited to water, but may be any liquid which evaporates such as organic solvent or liquid metal (mercury or the like). Although the viscosity of the liquid used depends on the cross-sectional area and length of the flow path, viscosity coefficient $\eta$ may preferably be 100 cP or less when the viscosity coefficient $\eta_{20}$ of distilled water at 20° C. under ordinary pressure is $\eta_{20}$ =1.0020 cP (1 cP=$10^{-3}$ $Nsm^{-2}$).

Also, solid materials such as coloring matters, salt and high molecular compounds may be dissolved in the liquid used, and polymer particulates, inorganic particles such as silica or particulates such as the bio-derived particles of cells may be dispersed in the liquid used.

Some examples of the method for evaporating the liquid which can be utilized in the present invention will now be enumerated below.

(1) Resistance Heating Method

This is heating by Joule heat in a conductor connected to a power source, and includes a direct resistance heating system and an indirect resistance heating system. The direct heating system is resistance heating in which heating is effected by an electric current being passed through liquid. In this case, the liquid must be an electrically conductive liquid having a suitable resistivity. The indirect resistance heating system is a system in which an electric current is passed through a heat generating conductor and heat generated in the conductor is transmitted to liquid, and the heat generating conductor may be a metallic heat generating element, a non-metallic heat generating element, molten salt, fluidized carbon particles or the like.

(2) Arc Heating Method

This is a method utilizing heat generated by an arc current.

(3) Induction Heating Method

This is a heating system in which a heating current is generated by electromagnetic induction, and liquid is heated by an eddy current loss or a hysteresis loss created in an electrically conductive body placed in an alternating magnetic field.

(4) Dielectric Heating Method

This is a method of generating heat by the rotational movement of an electric dipole of a dielectric material in an alternating electric field, and the frequency of alternating electrolysis utilized is 50 Hz to several MHz.

(5) Electromagnetic Wave Application

This is a method of directly heating liquid by a microwave of 300 MHz–300 GHz.

(6) Light-Heat Conversion Heating Method

This is a method of applying light to a light absorbing member to cause the light absorbing member to generate heat, and indirectly heating liquid in contact with the light absorbing member.

(7) Infrared Ray Heating Method

This is a heating method in which heat energy is transmitted chiefly by the radiation of infrared rays.

[Embodiment 1]

Figure 2A:
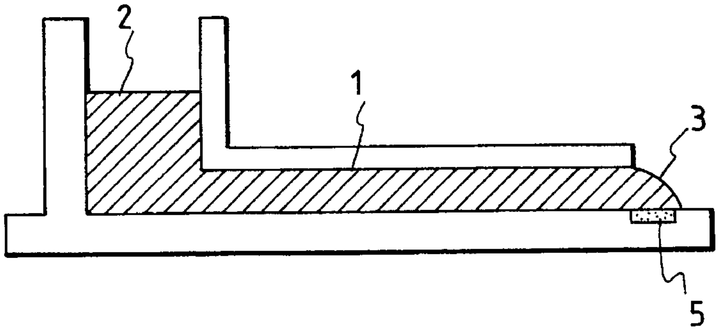
FIGS. 2A and 2B show the construction of the essential portions of a first embodiment of the present invention.
Figure 2B:
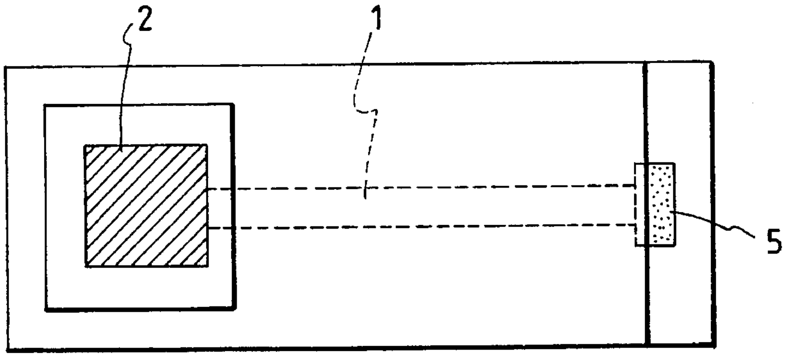

Some specific embodiments will hereinafter be described. FIGS. 2A and 2B show the construction of the essential portions of the apparatus of a first embodiment, FIG. 2A being a side view, and FIG. 2B being a top plan view. A flow path portion 1 has a cross-sectional area of 0.1 $mm^2$, and a liquid reservoir portion 2 has a content volume of 2 $mm^2$. The liquid reservoir portion 2 is of a rectangular parallelopiped shape and its cross-sectional area is constant irrespective of the surface level of liquid stored therein. A heat generating element 5 is joined to the underside of the opening portion 3 of the flow path and is adapted to generate heat by the application of a voltage thereto so as to impart gasifying energy to the liquid. The flow path can be formed of a material such as glass, plastic, a metal or a semiconductor, but a material which will not be dissolved or corroded by the liquid used is chosen. It is preferable that the inner wall of the flow path be formed of a material which is relatively highly lyophilic to the liquid or be subjected to a lyophilic treatment, because capillary phenomenon will be more expedited. The material of the heat generating element 5 may be NiCrFe or FeCrAl material called electrothermal alloy, molybdenum, tungsten, tantalum, silicon carbide, $HfB_2$, molybdenum silicide or zirconia heat generating element.

Figure 3:
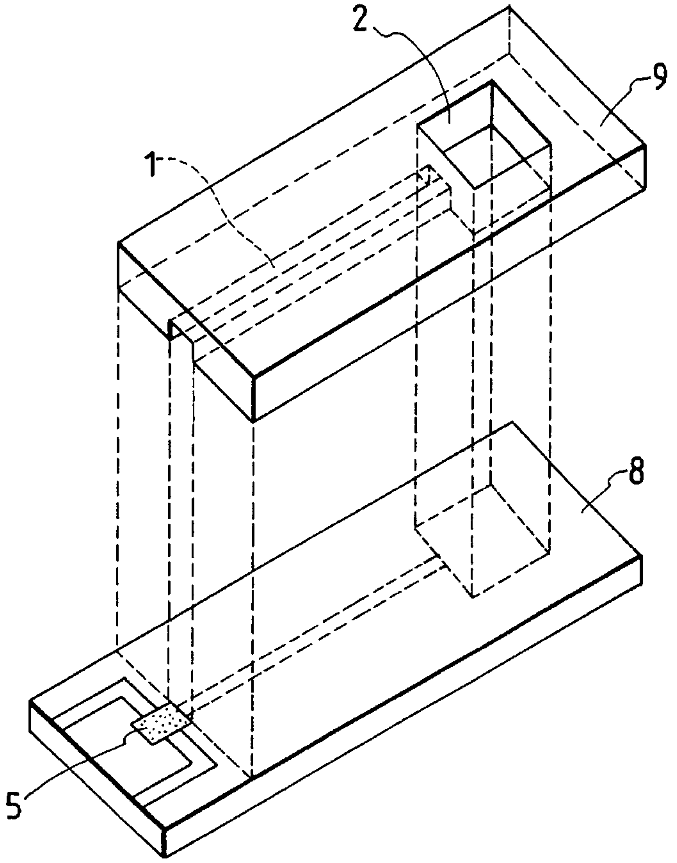
FIG. 3 shows an example of a method of manufacturing the apparatus of the embodiment.

As a method of manufacturing the apparatus of the present embodiment, utilization can be made of the semiconductor manufacturing process or a method including the molding method. FIG. 3 shows an example of the method of manufacturing the apparatus of the present embodiment, and this method manufactures a cartridge by the simple step of cementing together two base plates (a lower base plate 8 and an upper base plate 9) worked by the semiconductor manufacturing process or the molding method or the like, and is suitable for mass production by batch treatment and can provide products inexpensively. It is also easy to arrange a plurality of flow paths in parallel in a cartridge to thereby make them into an array. The manufacturing method will hereinafter be described in greater detail. The manufacturing process generally comprises the following three steps.

(Step 1)

A hole which will provide the liquid reservoir portion 2 is formed in a glass base plate which will provide the upper base plate 9, and a groove which will provide the flow path portion 1 is further formed therein. As a method of forming the groove in the glass base plate, photosensitive glass is used and sensitized by photolithography or glass is etched to a desired depth by hydrofluoric acid. As another method, for example, resist may be applied to a glass base plate or a silicon base plate, and be developed and solidified by the photolithographic process, whereby the resist-removed portion may be used as the groove. Also, a silicon base plate formed by etching the patterns of the storing portion and flow path portion can be anode-joined to a glass base plate to thereby form the groove. The method of working a glass base plate to form the groove is not restrictive, but a light-transmitting resin material may be used and the upper base plate may be made by molding using the molding method or the like.

(Step 2)

Figure 4:
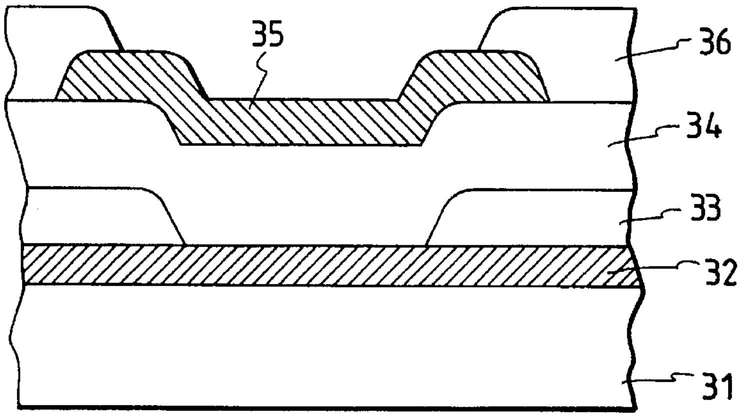
FIG. 4 represents the structure of a heat generating element.

The heat generating element 5 is joined to a silicon base plate which will provide the lower base plate 8. FIG. 4 shows the detailed construction of the heat generating element formed on the silicon base plate. This manufacturing step is as follows. Silicon oxide film is formed on a silicon base plate 31, whereafter $HfB_2$ layer 32 and Al layer 33 are laminated and are formed as a heat generating portion and an electrode portion, respectively, by the use of the photolithographic process. Further, $SiO_2$ and Ta are successively laminated as an insulating layer 34 and protective film 35, respectively, on the portion of the electrode portion except a wire boding portion, whereafter Ta alone is pattern-formed in a belt-like shape around the heat generating portion by the photolithographic process. A resin layer 36 is then pattern-formed on the $SiO_2$ layer which is not covered with Ta, in order to enhance the segregation of the electrode and liquid, whereby a heat generating element is made.

(Step 3)

As shown in FIG. 3, the lower base plate 8 which is the silicon base plate and the upper base plate 9 which is the glass base plate are adhesively joined to each other.

The operation of the apparatus of the above-described construction will now be described. By the aforedescribed principle, the liquid moves in the flow path without any pulsating flow, and the flow rate of the flow (the movement speed in the flow path) can be controlled by the amount of gasifying energy imparted, i.e., the applied voltage to the heat generating element, and if for example, it is desired to obtain an increased flow rate, the amount of energy imparted can be increase. In the present embodiment, a feedback mechanism is further incorporated to stabilize the flow rate in the flow path.

Figure 5:
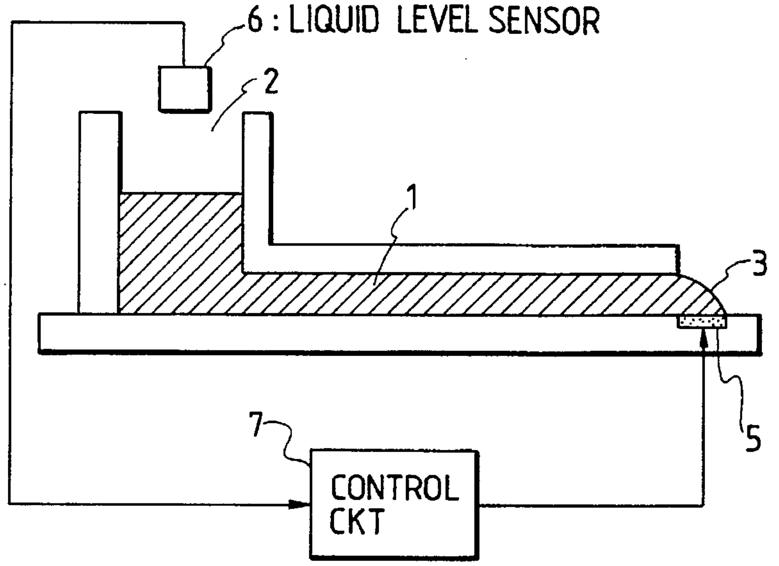
FIG. 5 shows the general construction of the first embodiment.

FIG. 5 shows the entire present embodiment including a control system. A liquid level sensor 6 is provided in the upper portion of the liquid reservoir portion 2 and detects the level of the liquid surface. The detection signal of the liquid level sensor 6 is sent to a control circuit 7, in which the voltage applied to the heat generating element 5 is controlled in conformity with the detection signal. More particularly, in the control circuit 7, the output signal of the liquid level sensor 6 is time-differentiated to thereby obtain information representative of the flow rate or the movement speed of the liquid, and feedback control is effected so that this information may become constant, whereby the flow rate of the liquid in the flow path is kept at a desired constant value. By the feedback control being thus effected, a constant flow rate can be maintained without being affected, for example, by a pressure change caused by a change in the liquid level in the liquid reservoir portion 2 or a change in heat generation efficiency caused by the adherence of impurities to the heat generating element 5. In the apparatus of the present embodiment, stable liquid feeding of a flow rate of the order of 7 μl/min. has been achieved.

In the present embodiment, the flow rate information is obtained by the use of the liquid level sensor 6, whereas the form of the sensor is not restricted thereto, but a flow rate sensor (such as an electromagnetic flow rate sensor, an ultrasonic flow rate sensor, a thermal flow rate sensor or an optical flow rate sensor) or a pressure sensor can also be provided to detect the flow rate.

[Embodiment 2]

Figure 6:
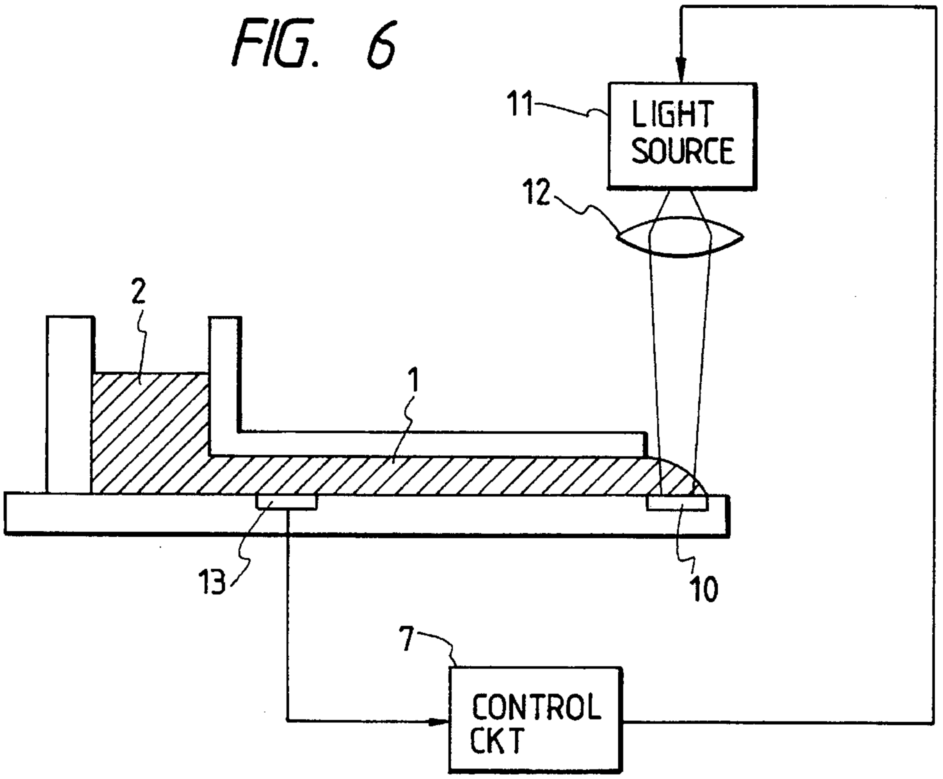
FIG. 6 shows the construction of a second embodiment of the present invention.

A second embodiment of the present invention will now be described. FIG. 6 is a side view of the second embodiment of the present invention. In FIG. 6, reference numerals similar to those in the previous embodiment designate similar members. In the present embodiment, the constructions of the flow path and liquid reservoir portion are similar to those in the first embodiment, but the present embodiment is characterized by utilizing the application of light to impart gasifying energy to the liquid and heat the liquid. The cross-sectional area of the flow path 1 is 2500 $\mu m^2$, and the content volume of the liquid reservoir portion 2 is 2 $mm^2$. Also, a light absorbing member 10 formed by carbon paper is formed near the opening in the flow path. A light source 11 is a semiconductor laser (wavelength 830 nm and 30 W), and light from the light source 11 is condensed by a lens 12 and is applied to the light absorbing member 10 to thereby impart gasifying energy to the liquid. When the application of the light is done, the light absorbing member 10 absorbs the light and is heated thereby, and the liquid on the light absorbing member 10 is heated and gasified. Thereupon, an amount of liquid corresponding to the gasified amount is supplied from the liquid reservoir portion into the flow path by capillary phenomenon, and the liquid continues to be gasified, whereby a flow of liquid is formed. A sensor 13 is a flow rate sensor for detecting the flow rate in the flow path 1, and the control circuit 7 controls the light emission output of the light source 1 so that the flow rate may be kept at a desired value on the basis of the output of the sensor.

[Embodiment 3]

Figure 7:
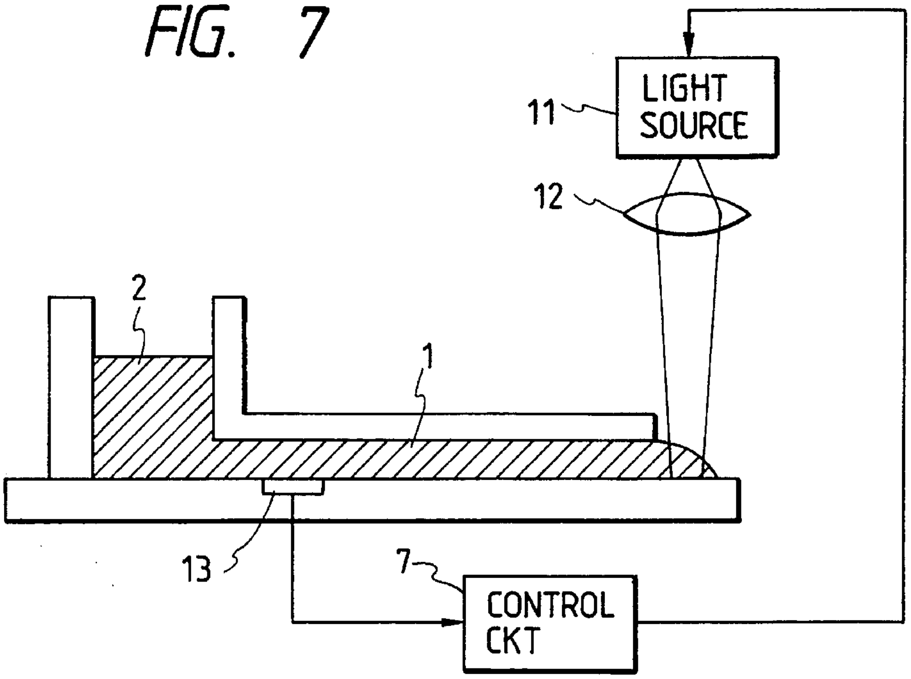
FIG. 7 shows the construction of a third embodiment of the present invention.

A third embodiment of the present invention will now be described with reference to FIG. 7. Reference numerals similar to those in the previous embodiment designate similar members. In the present embodiment, the liquid is directly heated by the application of light thereto and therefore, there is adopted a light source generating light which covers the absorption wavelength of the liquid. Where for example, the liquid is composed chiefly of water, use can be made of a light source generating light of the infrared area, for example, an infrared semiconductor laser or a far infrared lamp. In the embodiment of FIG. 7, a semiconductor laser (wavelength 1550 nm and 5 mW) is used as the light source 11, whereby the liquid can be directly heated by the application of light thereto and be gasified. As in the above-described embodiment, in the control circuit 7, the light source 11 is feedback-controlled on the basis of the detection output of the flow rate sensor 13.

[Embodiment 4]

Figure 8:
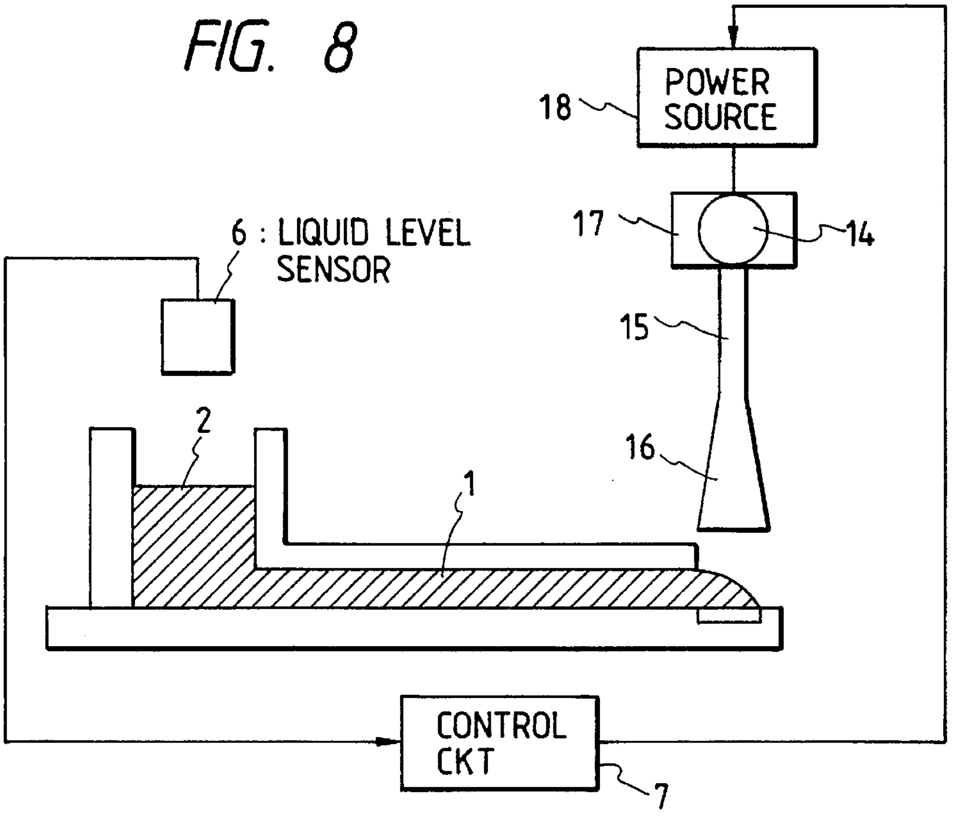
FIG. 8 shows the construction of a fourth embodiment of the present invention.

A fourth embodiment of the present invention will now be described with reference to FIG. 8. In FIG. 8, reference numerals similar to those in the previous embodiment designate similar members. The above-described second and third embodiments adopt the heating system using light, but the present embodiment is characterized by heating the liquid by electromagnetic waves. In FIG. 8, an electromagnetic wave source 14 generating electromagnetic waves uses a magnetron and generates microwaves of 2450 MHz. The generated microwaves are guided by a waveguide 15, and through an electromagnetic horn 16, directly heat and gasify the liquid exposed outwardly of the opening portion of the flow path. A cooling device 17 for cooling the electromagnetic wave source 14 and a power source 18 are connected to the electromagnetic wave source 14. As in the above-described embodiment, in the control circuit 7, the power source 18 is controlled on the basis of the detection output of the sensor 6 to thereby control a signal applied to the magnetron of the electromagnetic wave source 14 and vary the output of the electromagnetic wave source.

Figure 9A:
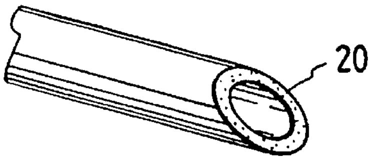
FIGS. 9A and 9B show shows an example of the shape of an opening portion.
Figure 9B:
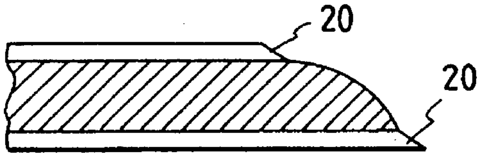

Now, in each of the embodiments hitherto described, contrivances are exerted on the opening portion of the flow path to prevent the liquid from flowing naturally out of the opening portion. Some forms of the opening portion will be shown below. FIGS. 9A and 9B show a form in which the distal end portion of the flow path is obliquely cut away and the cut-away cross-section 20 is subjected to a lyophobic treatment, whereby the exposed liquid may stay in the opening portion of the flow path by its surface tension. As an example of the lyophobic treatment, where the liquid is composed chiefly of water, a silicon water repellent agent is applied to the cut-away cross-section.

Figure 10A:
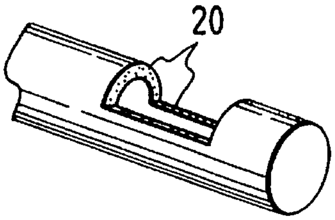
FIGS. 10 and 10B show shows an example of the shape of the opening portion.
Figure 10B:
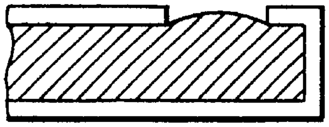
Figure 11A:
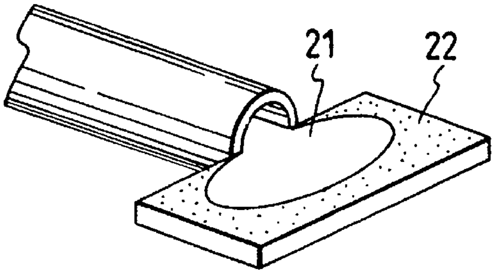
FIGS. 11A and 11B show shows an example of the shape of the opening portion.
Figure 11B:
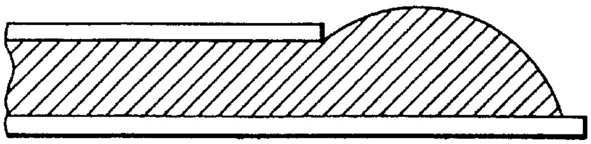

FIGS. 10A and 10B show a form in which the upper surface of the flow path near the distal end portion thereof is cut away and the cut-away cross-section 20 is subjected to a lyophobic treatment, whereby the exposed liquid may stay in the flow path. FIGS. 11 11*a* and 11B show a form in which a lyophilically treated portion 21 and a lyophobically treated portion 22 around it are provided, whereby the liquid spread from the opening in the flow path to the surface of the lyophilically treated portion 21 and exposed may stay in the lyophilically treated portion so as not to enter the lyophobically treated portion 22. In this manner, when no gasifying energy is imparted, the flow of the liquid will come to a standstill, and only when gasifying energy is imparted, a flow rate conforming to the amount of imparted energy can be created.

[Embodiment 5]

Figure 12:
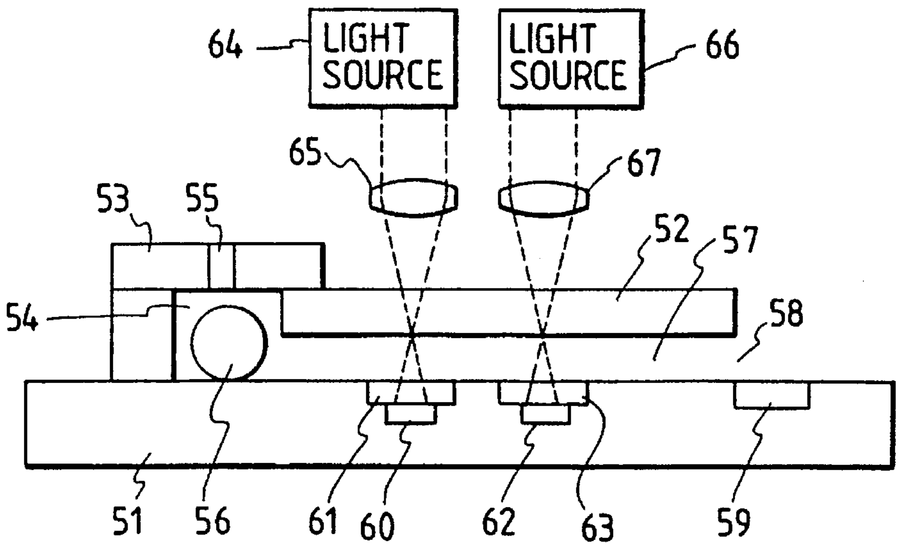
FIG. 12 is a side view showing the construction of an embodiment of a sample measuring cartridge.
Figure 13A:
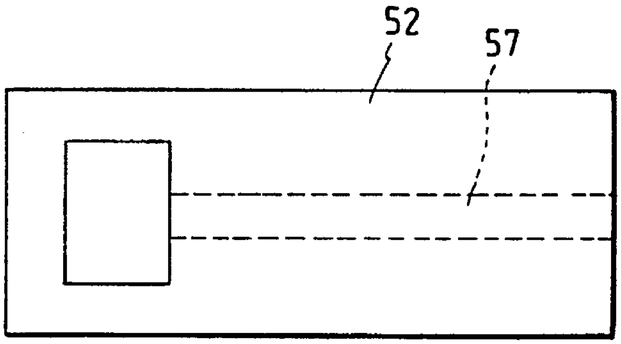
FIGS. 13A and 13B show is a top plan view of a second base plate and a first base plate constituting the cartridge.
Figure 13B:
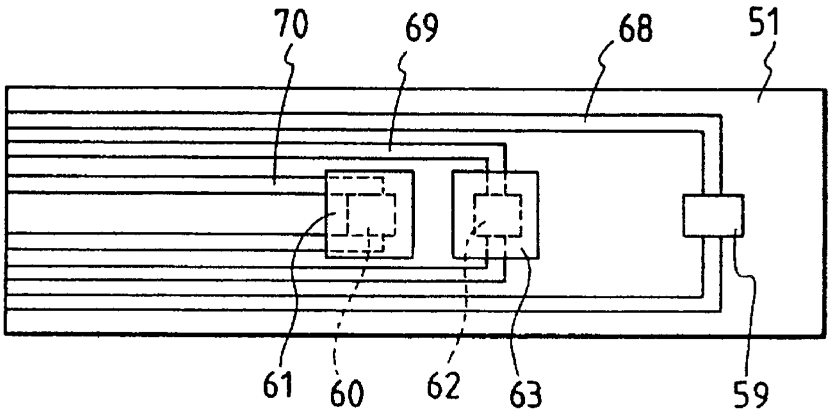
Figure 14A:
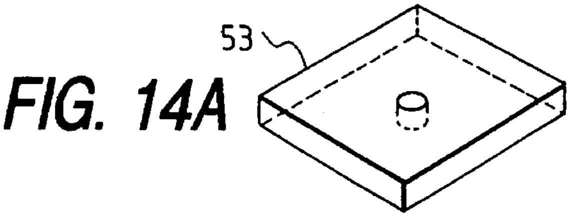
FIGS. 14A and 14B and 14C show is an assembly view of the cartridge.
Figure 14B:
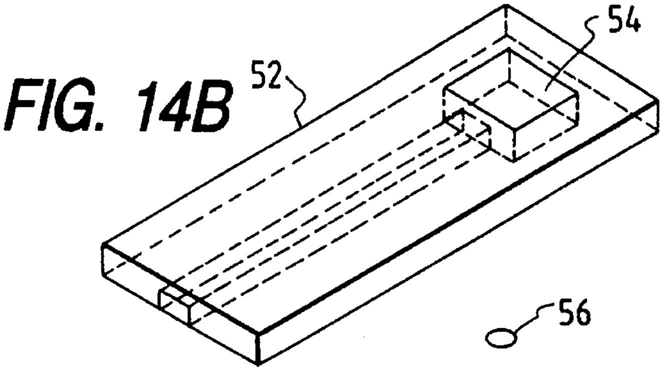
Figure 14C:
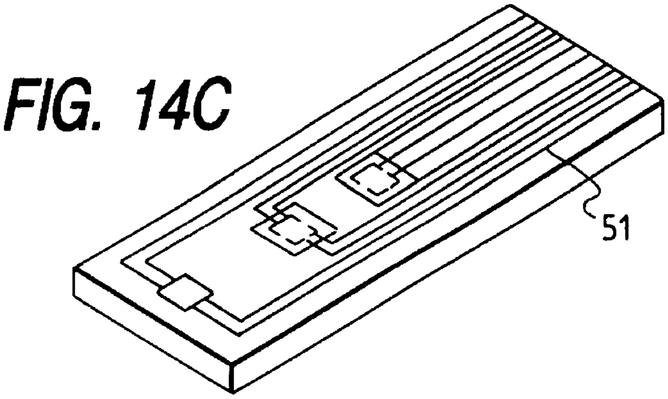

As an embodiment to which the above-described apparatus is applied, description will now be made of a measuring cartridge in which sample liquid is reacted with a reagent to obtain reacted liquid and optical measurement is effected with this reacted liquid passed through the flow path portion, whereby the measurement of the sample liquid is effected. FIG. 12 is a side view showing the structure of a cartridge according to a first embodiment, FIGS. 13A and 13B are top plan views of a first base plate and a second base plate as they are seen from above them, and FIGS. 14A and 14B and 14C show an assembly view of the cartridge.

The cartridge according to this embodiment has a construction in which a first base plate 51, a second base plate 52 and a third base plate 53 are joined together, the first base plate 51 being a silicon base plate, and the second base plate 52 and the third base plate 53 being glass base plates. By the joining of these base plates, a space forming an accumulating portion 54 which is a reacting bath is formed in the cartridge. An inlet port 55 which is a hole for pouring liquid such as sample liquid is formed in the third base plate 53, whereby the sample liquid can be poured from the outside into the accumulating portion 54. A spherical insoluble carrier 56 having a reagent fixed to the surface thereof is enclosed in the accumulating portion 54. The insoluble carrier 56 is formed of ceramics such as glass, plastic consisting of a high molecular compound, a metal such as a magnetic material, or a composite material thereof, and is subjected to a surface treatment introducing a covalent group or the like so as to permit the reagent to be readily fixed thereto. The shape of the insoluble carrier 56 is not limited to a spherical shape, but may also be another shape such as a polygonal shape, and the number thereof is not limited to one, but may be none. Alternatively, instead of using the insoluble carrier, the reagent may be directly fixed to the inner wall surface of the accumulating portion 54. The reagent will be described later in detail.

A flow path portion 57 is connected to the accumulating portion 54, and an opening at the end thereof provides a nozzle opening 58. The nozzle opening 58 has a tapered shape, whereby it is endowed with a passage resistance action. Near the nozzle opening 58, a micropump 59 is formed on the first base plate 51. The micropump 59 serves to impart energy to the sample liquid exposed outwardly of the opening portion and evaporate the exposed sample liquid, and has a construction similar to any one of the aforedescribed embodiments.

With the micropump 59, a responsive element for effecting the measurement of the sample liquid is provided on the surface of the first base plate 51. Specifically, in order to optically detect the state of the sample liquid, a first light detecting element 60, a first optical filter 61 having the wavelength selecting function, a second light detecting element 62 and a second optical filter 63 are formed on the base plate by a manufacturing method which will be described later. These members together constitute an optical detecting portion for selectively receiving first and second light arriving through the sample liquid. In the present embodiment, there has been shown an example in which the sample liquid is optically measured, whereas this is not restrictive, but for example, the sample liquid may be measured by the use of an electrical, magnetic or acousto-optical technique. Further, these may be compounded to measure the sample liquid. In such case, like the optical detecting portion of FIG. 12, responsive elements (such as an electrode, a magnetic detecting element, etc.) suitable for measurement may be joined together on the base plate.

As shown in FIG. 13, the heat generating element 59 of the micropump and the first and second light detecting elements 60 and 62 are joined to the first base plate 51, and electrically conductive patterns 68, 69 and 70 are connected to these elements, respectively, and are patterned on the surface of the first base plate 51, as shown. When the first base plate 51 and the second base plate 52 are joined together, the end portions of the electrically conductive patterns 68, 69 and 70 are exposed outside so that they can contact and conduct with outside terminals.

The above-described members are all integrated to form a cartridge. On the other hand, discretely from the cartridge, a light applying portion comprising light sources 64, 66 and condensing lenses 65, 67 as shown in FIG. 12 is provided to apply irradiating light which is measuring energy toward the sample liquid in the flow path portion 57 to thereby examine the degree of coloration of the sample liquid or cause fluorescence or scattered light to be created from the sample liquid. The light sources 64 and 66 may suitably be, for example, semiconductor lasers, LEDs, halogen lamps, tungsten lamps, mercury lamps or the like. Where light emitted from an object to be examined itself, such as chemiluminescence or bioluminescence is detected to effect measurement, the application of light is unnecessary and therefore the light applying portion need not be provided.

Figure 15:
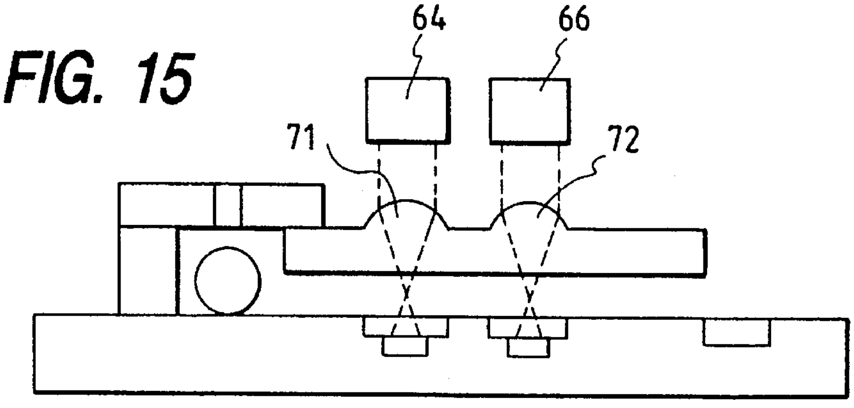
FIG. 15 shows a modification of the cartridge.
Figure 16:
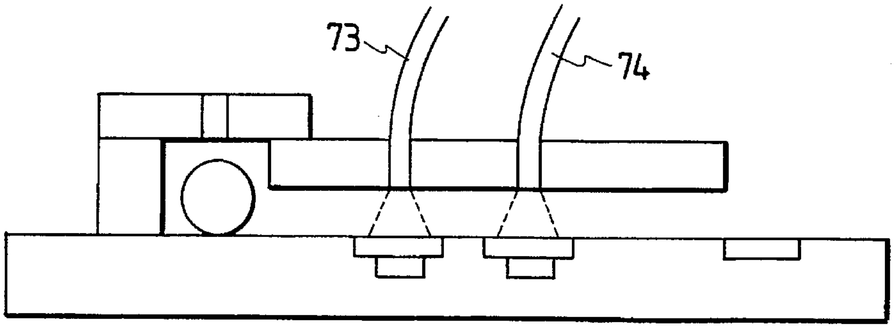
FIG. 16 shows another modification of the cartridge.
Figure 17:
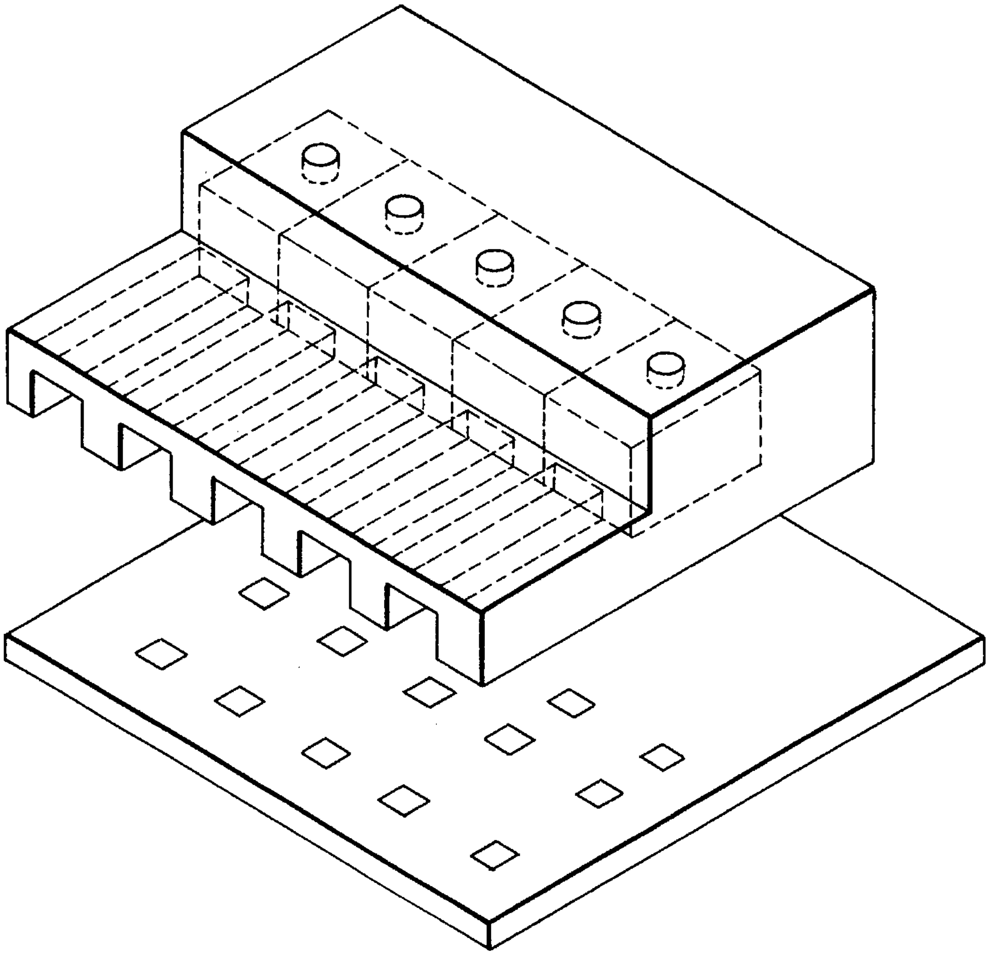
FIG. 17 shows still another modification of the cartridge.

Here are shown some modifications of the cartridge. FIG. 15 shows an example in which condensing lens portions 71 and 72 are integrally formed on the upper surface of the base plate. The condensing lenses may be spherical lenses, Fresnel lenses, zone plates or the like. FIG. 16 shows an example in which the introduction of irradiating light is effected by the use of optical fibers 73 and 74, and this example is characterized in that the alignment of the optical axes of the light source and cartridge becomes unnecessary. FIG. 17 shows an example of the cartridge in which the above-described form is further developed, that is, measurement modules comprising an accumulating portion, a flow path portion and an element, respectively, are highly densely arranged in parallel on a base plate and made into an array.

The reagent used in the present embodiment will now be described in detail. The reagent is fixed to the surface of the insoluble carrier enclosed in the accumulating portion, or directly fixed to the inner wall surface of the accumulating portion. The reagent used in the present embodiment contains at least biological materials, and the selection of the biological materials is determined by a substance to be analyzed or an object to be examined. That is, by selecting those of the biological materials which exhibit biological singularity to the object to be examined, singular detection becomes possible.

The biological materials herein referred to so include, for example, natural or synthetic peptide, protein, enzyme, saccharides, lectin, virus, bacteria, nucleic acids such as DNA and RNA, antibodies, etc. Among them, the following substances are mentioned as clinically particularly useful substances: immunoglobulins such as IgG and IgE, a complement, CRP, ferritin, blood plasma protein such as $\alpha_1$ or $\beta_2$ microglobulin and antibodies thereof, $\alpha$-fetoprotein, tumor markers such as carcinoembryonic antigen (CEA), CA19-9 and CA-125 and antibodies thereof, hormones such as luteinizing hormone (LH), follicle-stimulating hormone (FSH), human chorionic gonadotropin (hCG), estrogen and insulin and antibodies thereof, virus infection materials such as virus hepatitis antigen, HIV and ATL and antibodies thereof, bacteria such as diphtheria bacillus, botulinus bacillus, mycoplasma and treponema pallidum and antibodies thereof, prolozoans such as toroplasma, trichomonas, leishmania, trypanosoma and malaria and antibodies thereof, antiepileptics such as phenytoin and phenobarbital, cardiovascular agents such as quinidine and digoxinin, antiasthmatic agents such as theophylline, antibiotic substances such as chloramphenicol and gentamycin and antibodies thereof, enzyme, exotorin (such as streptolysin 0) and antibodies thereof; and substances which cause antigen-antibody reaction with detected substances in the object to be examined are suitably selected in conformity with the kinds of the detected substances. Also, where not antigen-antibody reaction but nucleic acid hybridization is utilized, use is made of a nucleic acid probe having a base sequence complementary to the base sequence of nucleic acid which is the object of examination.

Figure 18:
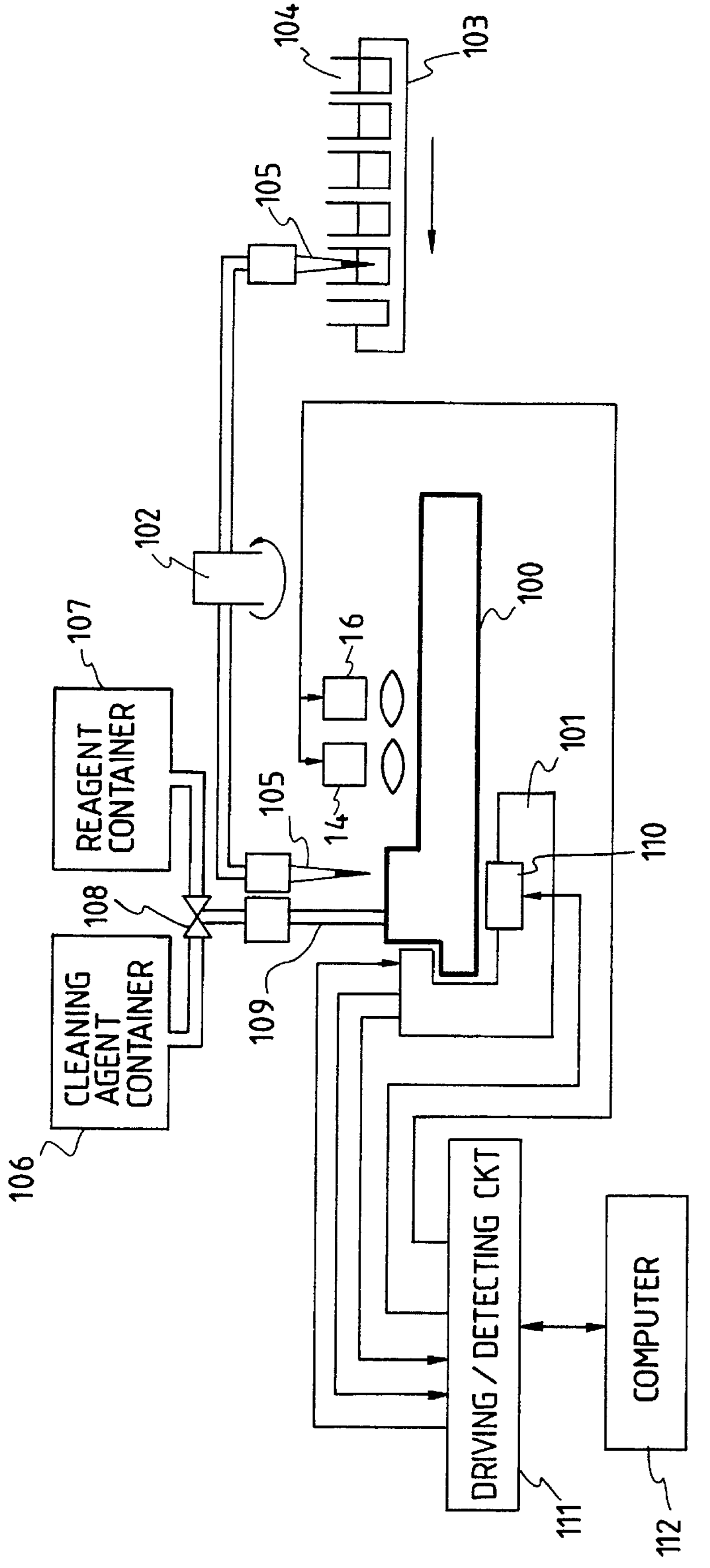
FIG. 18 shows the system construction of an embodiment of a sample measuring system.

FIG. 18 shows the construction of an entire system for effecting measurement with the above-described cartridge mounted. The above-described cartridge 100 is mounted and held on a cartridge holder 101. While in FIG. 18, only one cartridge is shown, a plurality of similar cartridges can be mounted in parallel or a cartridge comprising measurement modules made into an array as shown in FIG. 17 can be used, whereby a plurality of objects to be examined can be measured at a time or in succession.

A plurality of object containers 104 are arranged on a rack 103, and a plurality of sample liquids are contained in respective containers 104. A dispenser device 102 supplies the sample liquids in the object containers 104 successively to the cartridge 100 by the use of a pipet 105.

On the other hand, a cleaning agent container 106 contains therein a cleaning agent for B/F separation, and a reagent container 107 contains a reacting reagent therein. The flow path from each container is connected to a valve 108, which selectively changes over one of the containers, and the selected liquid is supplied to the cartridge 100 through a tube 109. Both the pipet 105 of the dispenser device 102 and the tube 109 can be connected to the inlet port of the cartridge 100, whereby desired liquid is supplied to the cartridge.

A stirrer 110 is mounted on the cartridge holder 101, and serves to stir the sample liquid and reagent in the accumulating portion of the cartridge 100 and expedite the reaction thereof. Stirring is effected, for example, by utilizing a magnet to remotely move the magnetic carrier reagent, or giving vibrations to the sample liquid by an ultrasonic wave.

Also, to improve the accuracy of measurement data, it is necessary to accurately control the temperature of the accumulating portion in the cartridge and for this purpose, the entire cartridge is held in a thermostatic box, not shown. Also, it is preferable to provide thermostatic means so as to keep the cleaning water, the reacting reagent and the object to be examined at a constant temperature as required.

The cartridge holder 101 is provided with an electrode which is connected to the exposed electrically conductive pattern of the cartridge 100 when the cartridge is mounted. This electrode is electrically connected to a driving/detecting circuit 111, which effects the driving of the light sources 64 and 66 for measurement, the driving of the stirrer 110, the driving of the dispenser device 102, the driving of the valve 108, the driving of the micropump in the cartridge and the detection of the outputs from two optical detecting elements in the cartridge. A computer 112 effects the control of the entire system and the measurement of the object to be examined based on the result of detection. By the utilization of antigen-antibody reaction, nucleic acid hybridization reaction, etc., coloration reaction or fluorescence and scattered light are detected and data-processed by a conventional technique such as the rate assay method or the end point method. Also, the comparison with analytical curve data prepared in advance is effected. The result of this analysis is output to a display, a printer or the like attached to the computer 112.

Thus, the present system is a simplified compact low-cost object measuring system because the cartridge 100 as a disposable one is interchanged with a new one for the measurement of each object to be examined. Also, because the cartridge is disposable, durability is not required of the micropump and responsive element, and the cartridges can be supplied at low costs.

The steps of detecting particular DNA in the sample liquid will be shown below as an example of the measurement by the above-described measuring system.

(Step 1)

A cartridge in which a single-stranded DNA probe which singularly effects hybridization reaction with desired particular DNA (single-stranded) is fixed as a reagent to an accumulating portion is prepared. When this cartridge is mounted on the cartridge holder of the measuring system, the pipet of the dispenser device automatically pours sample liquid containing a number of DNAs pre-organized into a single strand by a pre-process into the accumulating portion of the cartridge.

(Step 2)

The sample liquid in the accumulating portion of the cartridge is stirred by stirring means provided in the measuring system to thereby expedite reaction. If the desired single-stranded DNA exists in the sample liquid, it will singularly cause hybridization reaction with the DNA probe fixed to the accumulating portion and will produce two-stranded DNA.

(Step 3)

In order to remove the single-stranded DNA which has not effected hybridization reaction, cleaning liquid is poured and discharged and B/F separation is effected.

(Step 4)

An enzyme label probe is then poured into the accumulating portion and the two-stranded DNA produced by said hybridization reaction is singularly enzyme-labeled.

(Step 5)

B/F separation is again effected by cleaning and any excessive enzyme label probe is washed away.

(Step 6)

Reagent liquid containing a substrate which reacts with said enzyme label and exhibits coloration reaction or fluorescence luminescence or chemiluminescence is poured into the accumulating portion and is reacted.

(Step 7)

The micropump in the cartridge is operated and the reacted liquid of Step 6 is passed through the flow path portion. The light of the coloration reaction or the fluorescence luminescence or chemiluminescence is then detected by the light receiving element, and the amount of the desired DNA can be quantified from the quantity of detected light. Also, any variation in the quantity of detected light with time can be measured by the use of the rate assay method to thereby quantify the amount of the desired DNA more accurately.

According to the above-described object measuring cartridge and system, the following effects are obtained:

(1)

There is provided a stable fluid system free of pulsating flow and further, there is very little dead space of the flow path and therefore, only a slight amount of sample liquid is required.

(2) Energy is imparted to the waste liquid after measurement to thereby evaporate the waste liquid and therefore, a pasteurizing action or a sterilizing action for the sample liquid is obtained. In addition, no waste liquid is created and this is preferable from the viewpoint of the environmental problem of biohazard countermeasure or the like.

(3) Batch production becomes possible by the utilization of the semiconductor manufacturing process and cartridges of stable quality can be mass-produced inexpensively.

(4)

The light receiving element is made integral with the system, whereby the alignment of the optical system becomes unnecessary.

(5)

Cartridges having an intensive measuring function are supplied inexpensively, and a cartridge is interchanged with another each time a sample is measured and therefore, the construction of the fluid system becomes simple and the entire measuring system becomes very compact and highly reliable.

What is claimed is:

1. A measuring apparatus for measuring biological materials, comprising:

a liquid container for housing a liquid containing biological materials, said liquid container including a flow path having a measuring portion at which the biological materials within the flow path are measured, and an outlet downstream of the measuring portion which the flowed liquid is exposed to outside of the flow path;

a heater for constantly applying heating energy to the liquid exposed outside of the outlet of the flow path so as to constantly evaporate the exposed liquid and to generate smooth flow along the flow path; and a detector for measuring the biological materials in the liquid at the measuring portion in the flow path.

2. A measuring apparatus according to claim 1, wherein said detector is an optical detector.

3. A measuring apparatus according to claim 1, wherein said detector is an electrical detector.

4. A measuring apparatus according to claim 1, wherein said detector is a magnetic detector.

5. A measuring apparatus according to claim 1, wherein said detector is an acousto-optical detector.

6. A measuring apparatus according to claim 1, wherein said liquid container includes a reacting portion within the flow path for reacting the liquid with a reagent.

7. A measuring apparatus according to claim 1, wherein said heater comprises a heating element provided at the outlet.

8. A measuring apparatus according to claim 1, wherein said heater comprises a radiation source for irradiating a radiation beam at the outlet.

* * * * *

UNITED STATES PATENT AND TRADEMARK OFFICE

CERTIFICATE OF CORRECTION

PATENT NO. : 5,599,502

DATED : February 4, 1997

INVENTOR(S) : Miyazaki et al.

It is certified that error appears in the above-indentified patent and that said Letters Patent is hereby corrected as shown below:

COLUMN 2:

Line 27, "shows" should be deleted.
Line 29, "shows" should be deleted.
Line 31, "shows" should be deleted.
Line 36, "show is" should read --are--.
Line 38, "show is" should read --are--.

COLUMN 5:

Line 20, "increase." should read --increased.--.

COLUMN 7:

Line 7, "11 11a" should read --11A--.

Signed and Sealed this

Nineteenth Day of August, 1997

Attest:

Bruce Lehman

BRUCE LEHMAN

*Attesting Officer* *Commissioner of Patents and Trademarks*